US011153553B2

(12) United States Patent
Middleton et al.

(10) Patent No.: US 11,153,553 B2
(45) Date of Patent: *Oct. 19, 2021

(54) SYNTHESIS OF TRANSFORMED IMAGE VIEWS

(71) Applicant: Intel Corporation, Santa Clara, CA (US)

(72) Inventors: Daniel C. Middleton, Orono, MN (US); Jianbo Shi, Philadelphia, PA (US)

(73) Assignee: Intel Corporation, Santa Clara, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 16/704,058

(22) Filed: Dec. 5, 2019

(65) Prior Publication Data

US 2020/0186783 A1    Jun. 11, 2020

Related U.S. Application Data

(63) Continuation of application No. 15/136,501, filed on Apr. 22, 2016, now Pat. No. 10,567,739.

(51) Int. Cl.
*G06K 9/32*    (2006.01)
*H04N 13/271*  (2018.01)
(Continued)

(52) U.S. Cl.
CPC ......... *H04N 13/271* (2018.05); *G06T 3/0093* (2013.01); *G06T 5/005* (2013.01);
(Continued)

(58) Field of Classification Search
None
See application file for complete search history.

(56) References Cited

U.S. PATENT DOCUMENTS 6,424,351 B1    7/2002  Bishop et al.
7,084,877 B1    8/2006  Panusopone et al.
(Continued)

OTHER PUBLICATIONS

Zhu et al., "A new perspective on hole generation and filling in DIBR based view synthesis", Proc. 9th Int. Conf. Intell Inf. Hiding Multimedia Signal Process., pp. 607-610, Oct. 2013. (Year: 2013).

(Continued)

*Primary Examiner* — Feng Niu
(74) *Attorney, Agent, or Firm* — Hanley, Flight & Zimmerman, LLC (57) ABSTRACT

Techniques are provided for synthesis of transformed image views, based on a reference image, using depth information. The transformed image views may simulate a change in position or focal length of a camera that produced the reference image. An example system includes an image transformation circuit configured to transform the reference image corresponding to a first viewpoint, to a transformed image corresponding to a second viewpoint. The system also includes an inverse warping circuit configured to calculate a mapping from the pixels of the transformed image to corresponding pixels of the reference image. The system further includes a hole detection circuit configured to detect holes in the transformed image based on depth discontinuities between the reference and transformed images; and a hole filling circuit configured to in-fill the detected holes using a sampling of selected neighboring pixels from the reference image, to synthesize a view based on the transformed image.

23 Claims, 6 Drawing Sheets

(2 of 6 Drawing Sheet(s) Filed in Color)

(51) Int. Cl.
*G06T 3/00* (2006.01)
*G06T 5/00* (2006.01)
*H04N 13/111* (2018.01)
*G06T 15/20* (2011.01)
*G06T 7/50* (2017.01)

(52) U.S. Cl.
CPC ............... *G06T 7/50* (2017.01); *G06T 15/20* (2013.01); *H04N 13/111* (2018.05); *G06T 2207/10028* (2013.01)

(56) References Cited

U.S. PATENT DOCUMENTS

| | | | |
|---|---|---|---|
| 7,689,031 | B2 | 3/2010 | Berretty et al. |
| 8,073,292 | B2 | 12/2011 | Klein Gunnewiek |
| 8,538,159 | B2 | 9/2013 | Lu |
| 8,704,875 | B2 | 4/2014 | Cheng et al. |
| 9,092,657 | B2 | 7/2015 | Ahmad et al. |
| 9,094,660 | B2 | 7/2015 | Alregib |
| 9,105,130 | B2 | 8/2015 | Guo |
| 9,401,039 | B2 | 7/2016 | Maeda et al. |
| 9,503,702 | B2 | 11/2016 | Chen et al. |
| 9,514,522 | B2 | 12/2016 | Fu et al. |
| 9,824,260 | B2 | 11/2017 | Ahmad |
| 9,906,793 | B2 | 2/2018 | Fu et al. |
| 9,948,911 | B2 | 4/2018 | Wagner et al. |
| 10,070,115 | B2 | 9/2018 | Graziosi et al. |
| 10,567,739 | B2 | 2/2020 | Middleton et al. |
| 2005/0174346 | A1 | 8/2005 | Park et al. |
| 2012/0038625 | A1 | 2/2012 | Kim |
| 2012/0038626 | A1 | 2/2012 | Kim |
| 2012/0120192 | A1 | 5/2012 | Alregib et al. |
| 2012/0262542 | A1 | 10/2012 | Veera et al. |
| 2013/0271565 | A1 | 10/2013 | Chen et al. |
| 2014/0002595 | A1 | 1/2014 | Po et al. |
| 2014/0055560 | A1 | 2/2014 | Fu |
| 2014/0333739 | A1 | 11/2014 | Yang et al. |
| 2014/0376635 | A1* | 12/2014 | Senoh ............... H04N 13/161 375/240.16 |
| 2016/0286198 | A1 | 9/2016 | Ban |
| 2017/0064305 | A1 | 3/2017 | Fu et al. |
| 2017/0188002 | A1 | 6/2017 | Chan et al. |
| 2017/0316602 | A1 | 11/2017 | Smirnov et al. |
| 2019/0265646 | A1 | 8/2019 | Falkenberg et al. |

OTHER PUBLICATIONS

Zhu et al., "Depth image based view synthesis: New insights and perspectives on hole generation filling", IEEE Transactions on Broadcasting. Sep. 25, 2015; 62(1): 82-93.

Xu et al., "Depth-aided exemplar-based hole filling for DIBR view synthesis", in 2013 IEEE International Symposium on Circuits and Systems (ISCAS2013) May 19, 2013 (pp. 2840-2843). (Year: 2013).

Zhang et al., "Stereoscopic Image Generation Based on Depth Images for 3D TV", IEEE Trans. Broadcast., vol. 51, No. 2, pp. 191-199, Jun. 2005. (Year: 2005).

United States Patent and Trademark Office, "Non-Final Office Action," issued in connection with U.S. Appl. No. 15/136,501, dated May 30, 2019, 16 pages.

United States Patent and Trademark Office, "Notice of Allowance and Fee(s) Due," issued in connection with U.S. Appl. No. 15/136,501, dated Sep. 18, 2019, 7 pages.

* cited by examiner

SYNTHESIS OF TRANSFORMED IMAGE VIEWS

CROSS-REFERENCE TO RELATED APPLICATIONS

This application is a continuation application and claims the benefit of U.S. patent application Ser. No. 15/136,501, filed on Apr. 22, 2016, the entire content of which is herein incorporated by reference.

BACKGROUND

Imaging special effects, that can alter a user's perception of a scene, are often employed in movie productions with great entertainment effect. Such techniques can create parallax and perspective changes, simulated 3-dimensional views and other effects. Some existing methods to achieve these results require extensive manual effort, expensive software tools and a relatively advanced level of operator expertise. Other approaches require filming with multiple cameras from multiple viewpoints and performing post processing interpolation, which may also be expensive and can introduce undesirable artifacts in the resulting images. These approaches are also subject to the physical limitations of position and motion imposed by the rigging and tracks upon which the cameras are mounted.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for the synthesis of transformed image views, based on a reference image, using depth information. The transformed image views may simulate a change in position or focal length of the camera (whether real or virtual) that produced the reference image. The techniques can be used, for example, to create visual special effects on images that are captured with depth information. Flat (2-dimensional) still images may be transformed into dynamic moving sequences that simulate 3-dimensional effects and changing perspectives, including parallax effects and dolly-zoom simulations (e.g., where the camera zooms in while simultaneously pulling back from the scene, or vice versa).

In accordance with an embodiment, a view synthesis circuit may be configured to transform a reference image corresponding to a first viewpoint, to a transformed image corresponding to a second viewpoint, and detect and repair gaps or holes that result from the transformation. Techniques for hole detection may be based on depth discontinuities between the reference and transformed images. Techniques for hole repair or in-filling may include sampling of selected neighboring pixels from the reference image that are identified through an inverse warping that maps pixels in the transformed image back to corresponding pixels in the reference image. As will be further appreciated in light of this disclosure, the techniques provided herein may be applied in an iterative fashion to create a sequence of transformed images (e.g., a video sequence). Additionally, images may be synthesized corresponding to viewpoints that exceed the original reference view and which extend the view range over the limitations imposed by physical cameras and rigging equipment.

The techniques described herein may require only a single camera to generate a single reference image with depth information, according to some embodiments. The techniques may therefore provide for generally increased computational efficiency, reduced storage and reduced bandwidth for transmission, compared to existing methods, as will be appreciated in light of this disclosure. Additionally, these techniques can be implemented in any desired platform including, for example, a mobile device such as a smartphone. These techniques may further be implemented in hardware or software or a combination thereof.

Figure 1:
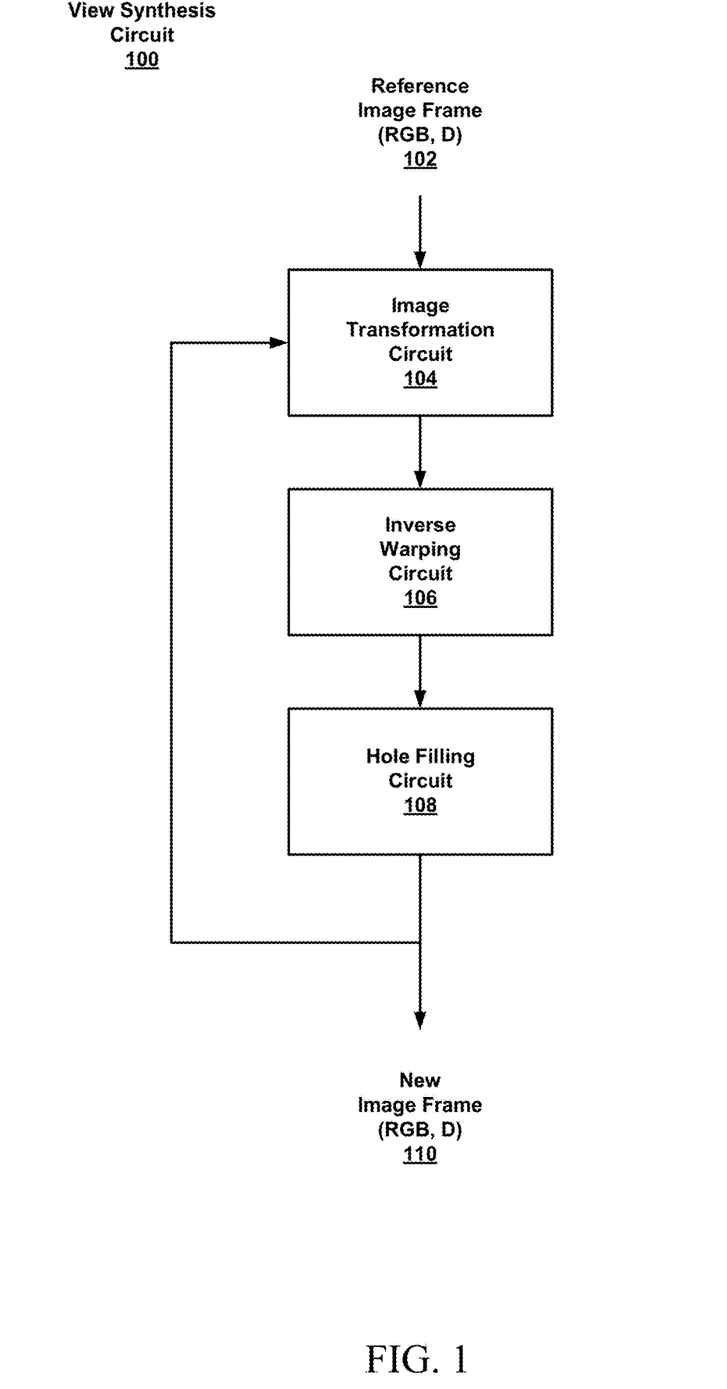
FIG. 1 is a top level block diagram of a view synthesis circuit, configured in accordance with certain of the embodiments disclosed herein.

FIG. 1 is a top level block diagram of a view synthesis circuit 100, configured in accordance with certain of the embodiments disclosed herein. A reference image frame 102 is provided as input to the view synthesis circuit 100, for example by a depth camera or from a memory system configured for image storage. The reference image frame includes a color image component and a depth map component. The color image may comprise an array of pixels that convey color data, for example red-green-blue (RGB) values. The color image component may also be referred to as providing image texture. The depth map may comprise an array of corresponding pixels that convey depth values (e.g., a measurement of range from the camera to the object associated with the pixel).

Figure 3:
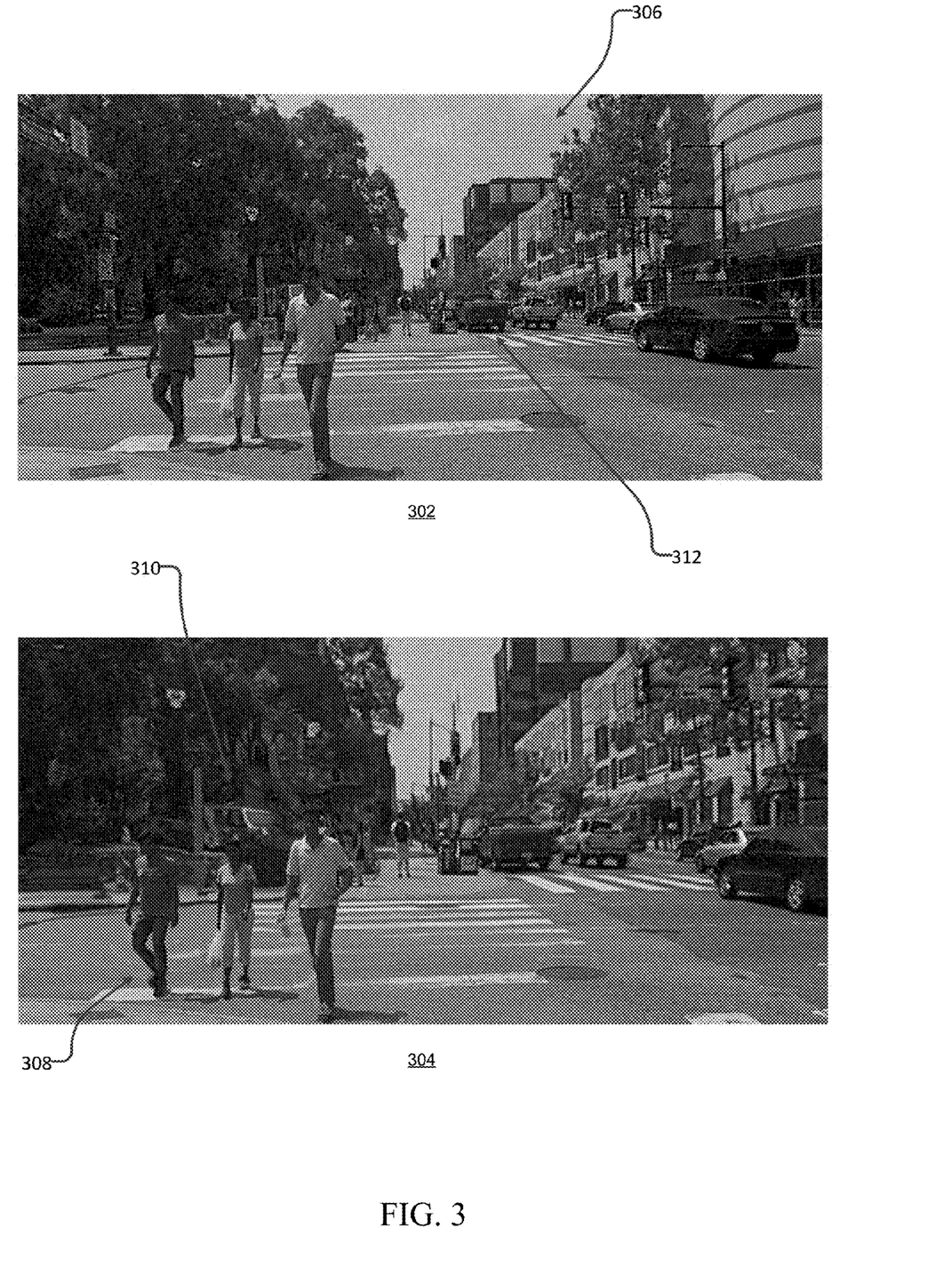
FIG. 3 illustrates image frames associated with processing by the view synthesis circuit, configured in accordance with certain of the embodiments disclosed herein.
Figure 4:
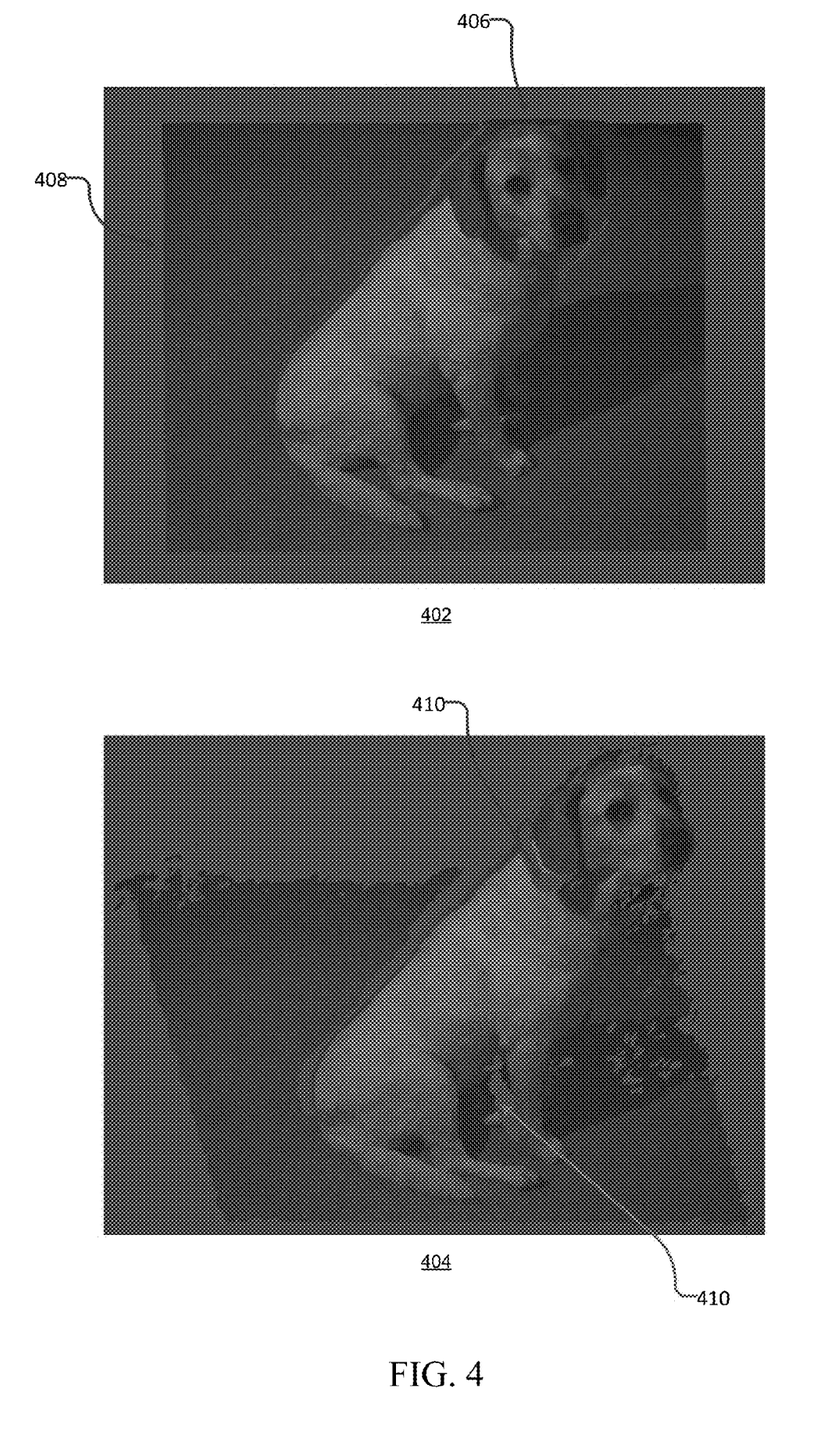
FIG. 4 illustrates holes in transformed image frames associated with processing by the view synthesis circuit, configured in accordance with certain of the embodiments disclosed herein.

The view synthesis circuit 100 is shown to include an image transformation circuit 104, an inverse warping circuit 106, and a hole filling circuit. The image transformation circuit 104 may be configured to transform the reference image frame from a first viewpoint, to a second viewpoint. The change in viewpoints may simulate a change in position of the depth camera and/or a change in the focal length of the lens of the depth camera to generate a different perspective of the scene for the viewer. The resulting transformed image frame may thus appear to be shifted, scaled, warped and/or reshaped in any desired manner. In some embodiments, different regions of the reference image frame may be transformed in different ways to create additional, more complex effects. Example of transformed images are illustrated in FIGS. 3 and 4 and described below. The image transformation may be implemented using known techniques in light of the present disclosure. For example, pixels may be mapped to a grid and the grid can then be warped. The image transformation process, however, will typically create gaps or holes in the new image where portions of the reference image that were previously occluded by other objects become exposed. This is also illustrated and described below in connection with FIG. 4. Because these regions were occluded, no image data is available to directly reconstruct them in the new view. This problem will be addressed in greater detail below.

Inverse warping circuit 106 may be configured to calculate a mapping from the pixels of the transformed image frame back to the corresponding pixels of the reference image frame. The mapping may be used to guide the hole filling circuit 108, which is configured to generate a new image frame 110 representing a synthesized view from the new perspective and including both RGB and depth images, the operation of which is described below.

In some embodiments, the view synthesis circuit 100 may be configured to generate a series of additional transformed image frames, for example, to create a video sequence. For example, the new image frame 110 may be used as the reference image frame for a subsequent iteration of the processes performed by circuits 104, 106 and 108 to generate a follow on transformed image corresponding to yet a new viewpoint. Such iterations may be repeated indefinitely to create a video sequence of any desired length.

Figure 2:
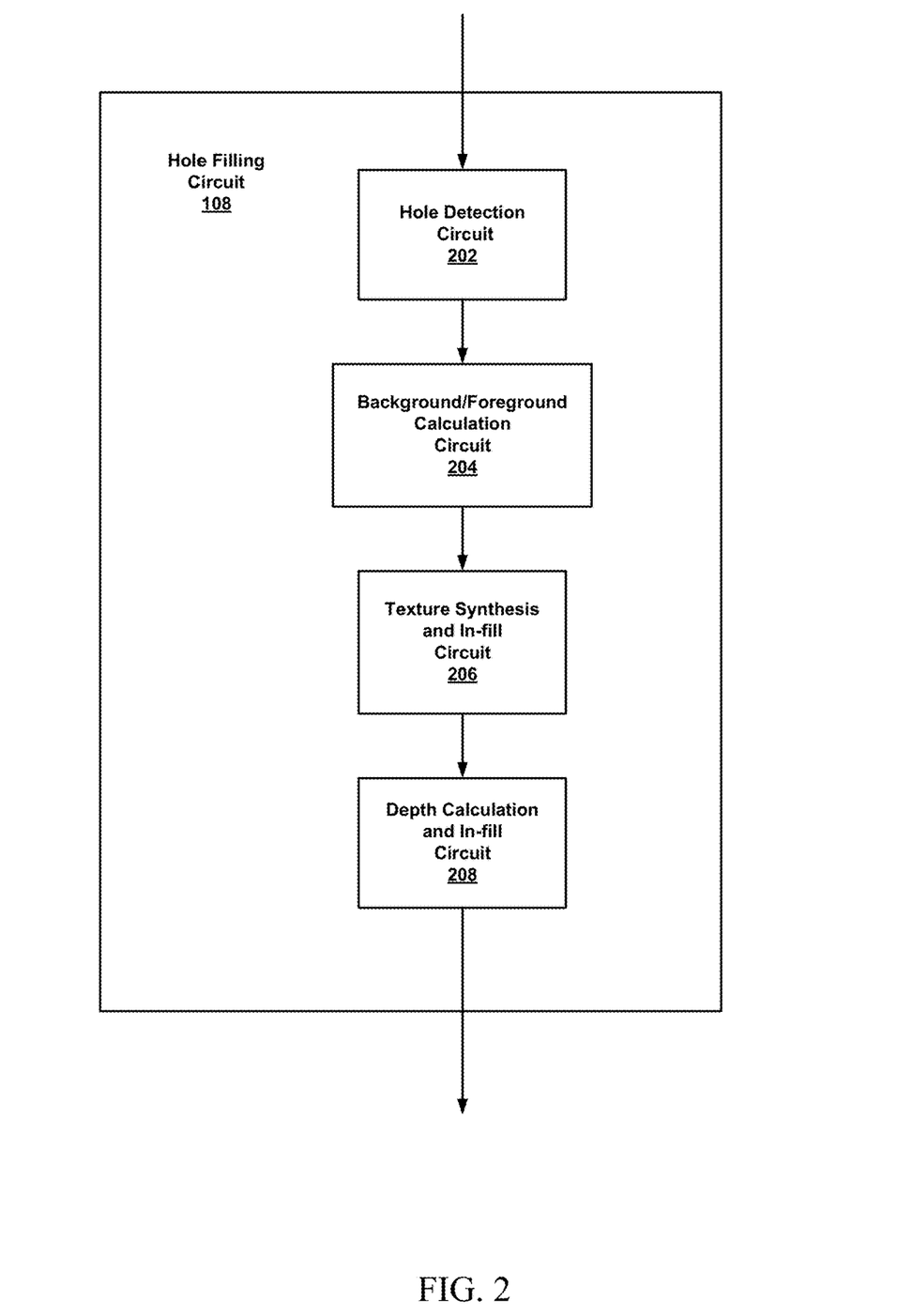
FIG. 2 is a more detailed block diagram of a hole filling component of a view synthesis circuit, configured in accordance with certain of the embodiments disclosed herein.

FIG. 2 is a more detailed block diagram of the hole filling circuit 108, configured in accordance with certain of the embodiments disclosed herein. The hole filling circuit 108 is shown to include a hole detection circuit 202, a background/foreground calculation circuit 204, a texture synthesis and in-fill circuit 206 and a depth calculation and in-fill circuit 208.

The hole detection circuit 202 may be configured to detect holes in the transformed image frame based on discontinuities between the depth values of the pixels of the transformed image frame and the depth values of the mapped corresponding pixels of the reference image frame. The discontinuities may be detected, for example, using an edge detection circuit or using other known techniques in light of the present disclosure The background/foreground calculation circuit 204 may be configured to analyze depth values of the pixels (e.g., depth map) of the reference image frame to identify foreground and background features in the reference image frame; and to preserve that foreground-background relationship of the features in the transformed image frame based on the analysis. In other words, if a red car appears to be in front of a blue car in the reference image, they should not switch positions when the perspective changes in the transformed image. For example, the blue car should not partially slice through the red car.

The texture synthesis and in-fill circuit 206 may be configured to in-fill the detected holes in the color (RGB) image of the transformed image frame, using a sampling of selected neighboring pixels from the reference image frame. The neighboring pixels may be determined through the mapping generated by the inverse warping circuit 106 and may be selected based on a measure of proximity to the detected holes. The neighboring pixels may further be selected based on a comparison of the depth values of the neighboring pixels to the depth values of pixels in the transformed image frame proximate to the discontinuity associated with the detected hole.

The depth calculation and in-fill circuit 208 may be configured to in-fill the detected holes in the depth map of the transformed image frame, also using a sampling of selected neighboring pixels from the reference image frame. The determination of neighboring pixels is similar to that of the texture synthesis and in-fill circuit 206, described above. The neighboring pixels may be determined through the mapping generated by the inverse warping circuit 106 and may be selected based on a measure of proximity to the detected holes. The neighboring pixels may further be selected based on a comparison of the depth values of the neighboring pixels to the depth values of pixels in the transformed image frame proximate to the discontinuity associated with the detected hole.

FIG. 3 illustrates image frames associated with processing by the view synthesis circuit, configured in accordance with certain of the embodiments disclosed herein. A reference image frame 302 is shown along with the transformed image frame 304. The perspective shift of the transformed image frame 304, in this case, simulates a change in focal length that results in a zoom effect for the image background 306 while maintaining the size and position of the people 308 in the foreground. For example, as can be seen, the red truck 312 appears larger in the transformed image and vehicle 310 shifts to the left.

FIG. 4 illustrates gaps or holes in the transformed image frames associated with processing by the view synthesis circuit, configured in accordance with certain of the embodiments disclosed herein. An example reference image frame 402 is shown to include a dog 406 against a background 408. A transformed image frame 404 is shown where the perspective viewpoint of the camera is shifted down and to the left, resulting in gaps or holes 410 which are marked by the color red. Some red is indicated in the reference image frame 402 along the boundary of the dog due to the fact that depth discontinuities are inherent at edge boundaries. As the viewpoint is transformed or warped, however, larger areas 410 require in-filling.

Methodology

Figure 5:
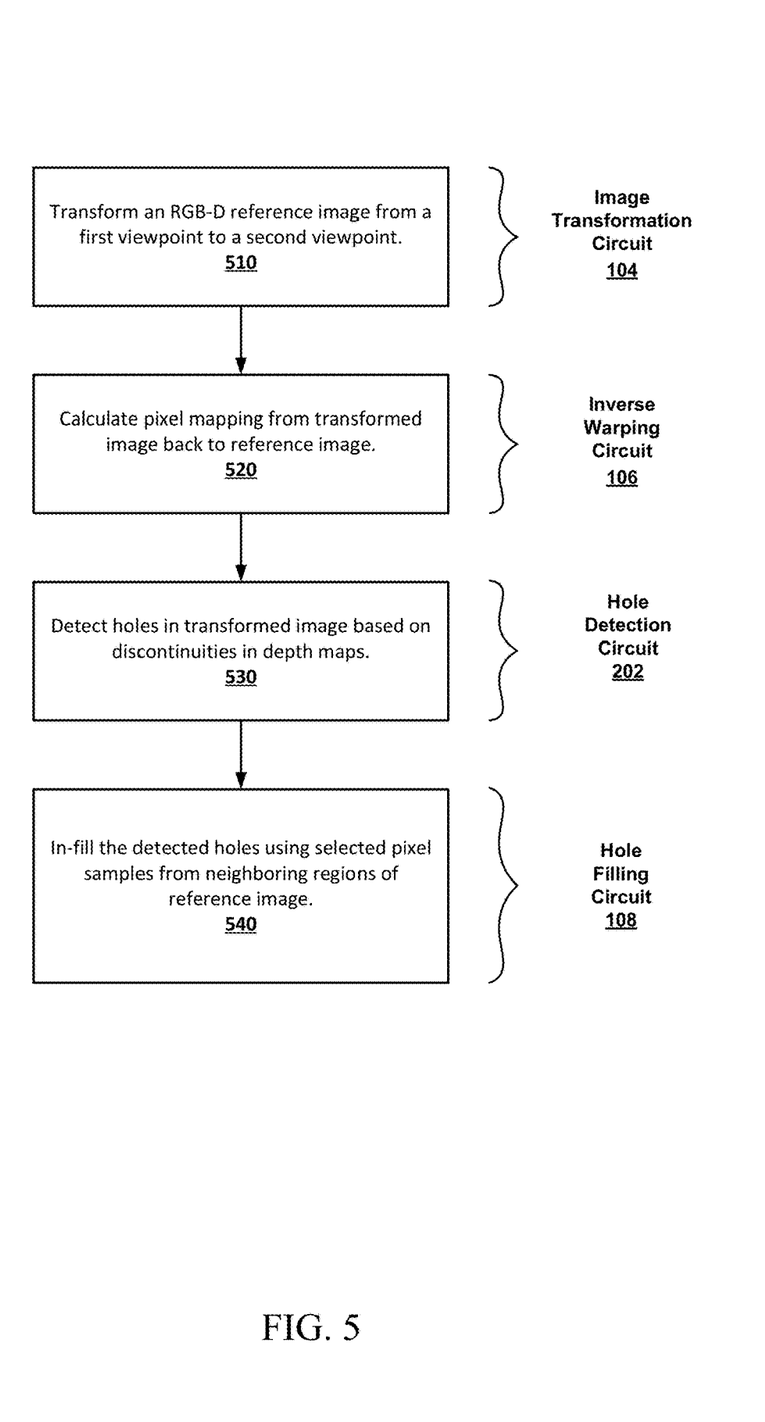
FIG. 5 is a flowchart illustrating a methodology for view synthesis, in accordance with certain of the embodiments disclosed herein.

FIG. 5 is a flowchart illustrating an example method 500 for synthesizing a transformed image view, in accordance with an embodiment of the present disclosure. As can be seen, example method 500 includes a number of phases and sub-processes, the sequence of which may vary from one embodiment to another. However, when considered in the aggregate, these phases and sub-processes form a process for view synthesis in accordance with certain of the embodiments disclosed herein. These embodiments can be implemented, for example using the system architecture illustrated in FIGS. 1 and 2 as described above. However other system architectures can be used in other embodiments, as will be apparent in light of this disclosure. To this end, the correlation of the various functions shown in FIG. 5 to the specific components illustrated in FIGS. 1 and 2 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 500. Thus other embodiments may have fewer or more modules and/or sub-modules depending on the granularity of implementation. Numerous variations and alternative configurations will be apparent in light of this disclosure.

As illustrated in FIG. 5, in one embodiment, method 500 for view synthesis commences by transforming, at operation 510, a reference image frame corresponding to a first viewpoint, to a transformed image frame corresponding to a second viewpoint. In some embodiments, the reference image frame may be received from a depth camera that provides both color (red-green-blue or RGB) pixels and depth pixels which may also be referred to as a depth map. The second viewpoint, of the transformed image frame, may correspond to a simulated change in position or focal length of the depth camera.

At operation 520, a mapping is calculated from pixels of the transformed image frame to the corresponding pixels of the reference image frame. Next, at operation 530, holes in the transformed image frame are detected. In some embodiments, the detection is based on discontinuities between the depth values of the pixels of the transformed image frame and the depth values of the mapped corresponding pixels of the reference image frame.

At operation 540, the detected holes are infilled using a sampling of selected neighboring pixels from the reference image frame to synthesize a view based on the transformed image frame. In some embodiments, the selection of neighboring pixels is based on a measure of proximity of the neighboring pixels to the detected holes. In some embodiments, the selection of neighboring pixels is further based on a comparison of the depth values of the neighboring pixels to the depth values of pixels in the transformed image frame proximate to the discontinuity associated with the detected hole.

Of course, in some embodiments, additional operations may be performed, as previously described in connection with the system. These additional operations may include, for example, analyzing depth values of the pixels of the reference image frame to identify foreground and background features in the reference image frame; and preserving the foreground-background relationship of the features in the transformed image frame based on the analysis. In some embodiments, the operations of method 500 may be iterated to generate a series of additional transformed image frames, for example, to create a video sequence, where the synthesized view from a previous iteration may be used as the reference frame for the next iteration.

Example System

Figure 6:
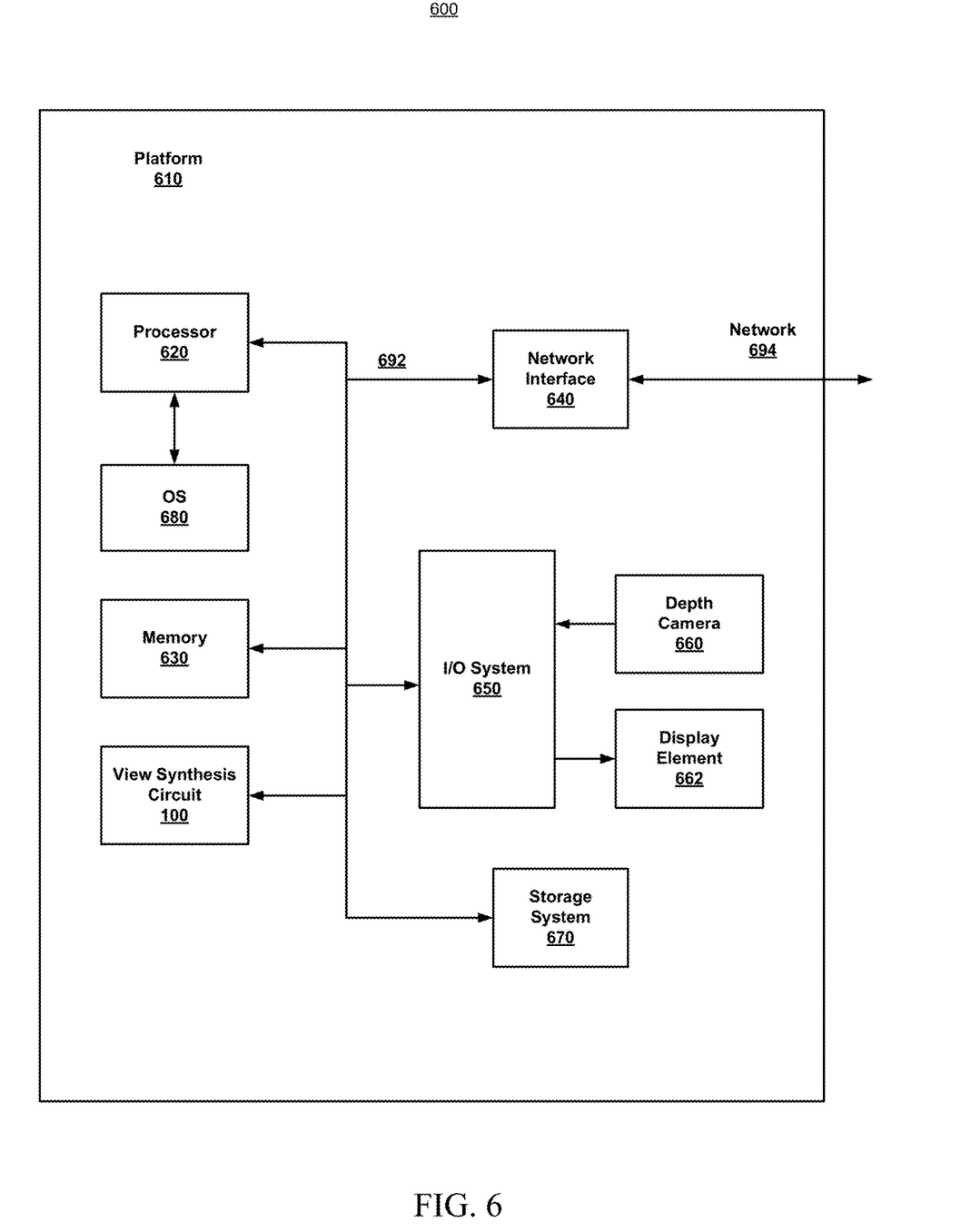
FIG. 6 is a block diagram schematically illustrating a system platform configured to perform view synthesis, configured in accordance with certain of the embodiments disclosed herein.

FIG. 6 illustrates an example system 600 configured to perform view synthesis, as described herein. In some embodiments, system 600 comprises a platform 610 which may host, or otherwise be incorporated into, a personal computer, workstation, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. Any combination of different devices may be used in certain embodiments.

In some embodiments, platform 610 may comprise any combination of a processor 620, a memory 630, a view synthesis circuit 100, a network interface 640, an input/output (I/O) system 650, a depth camera 660, a display element 662 and a storage system 670. As can be further seen, a bus and/or interconnect 692 is also provided to allow for communication between the various components listed above and/or other components not shown. Platform 610 can be coupled to a network 694 through network interface 640 to allow for communications with other computing devices, platforms or resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor or a graphics processing unit, to assist in control and processing operations associated with system 600. In some embodiments, the processor 620 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 600, and therefore may also be implemented using any suitable existing or subsequently-developed platform.

Network interface circuit 640 can be any appropriate network chip or chipset which allows for wired and/or wireless connection between other components of computer system 600 and/or network 694, thereby enabling system 600 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of computer system 600. I/O devices may include, but not be limited to, a depth camera 660, a display element 662, and other devices not shown such as a keyboard, mouse, microphone, speaker, etc.

I/O system 650 may include a graphics subsystem configured to perform processing of images for display element 662. Graphics subsystem may be a graphics processing unit or a visual processing unit (VPU), for example. An analog or digital interface may be used to communicatively couple graphics subsystem and display element 662. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 620 or any chipset of platform 610. In some embodiments, display element 662 may comprise any television type monitor or display. Display element 662 may comprise, for example, a computer display screen, touchscreen display, video monitor, television-like device, and/or a television. Display element 662 may be digital and/or analog. Under the control of the OS 680 (or one or more software applications), platform 610 may display synthesized image views on display element 662. The synthesized imaged views may be based on a reference image provided by depth camera 660 and processed by view synthesis circuit 100, as described herein.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

View synthesis circuit 100 is configured to transform image views, based on a reference image, using depth information and to fill in holes created by the transformation. The transformed image views may simulate a change in position or focal length of a camera that produced the reference image. View synthesis circuit 100 may include any or all of the components illustrated in FIGS. 1 and 2 and described above. View synthesis circuit 100 can be implemented or otherwise used in conjunction with a variety of suitable software and/or hardware that is coupled to or that otherwise forms a part of system 600. Circuit 100 can additionally or alternatively be implemented or otherwise used in conjunction with user I/O devices that are capable of providing information to, and receiving information and commands from, a user. These I/O devices may include display element 662, a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments view synthesis circuit 100 may be installed local to system 600, as shown in the example embodiment of FIG. 6. Alternatively, system 600 can be implemented in a client-server arrangement wherein at least some functionality associated with these circuits is provided to system 600 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 694 or remotely coupled to network 694 by one or more other networks and/or communication channels. In some cases access to resources on a given network or computing system may require credentials such as usernames, passwords, and/or compliance with any other suitable security mechanism.

In various embodiments, system 600 may be implemented as a wireless system, a wired system, or a combination of both. When implemented as a wireless system, system 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the view synthesis methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. In other embodiments the functionalities disclosed herein can be incorporated into other software applications, such as video editing applications, video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for view synthesis. The method comprises: transforming a reference image frame corresponding to a first viewpoint, to a transformed image frame corresponding to a second viewpoint, the reference image frame and the transformed image frame each comprising a plurality of pixels associated with color values and depth values; calculating a mapping from the pixels of the transformed image frame to corresponding pixels of the reference image frame; holes in the transformed image frame based on discontinuities between the depth values of the pixels of the transformed image frame and the depth values of the mapped corresponding pixels of the reference image frame; and performing in-filling of the detected holes, using a sampling of selected neighboring pixels from the reference image frame, to synthesize a view based on the transformed image frame.

Example 2 includes the subject matter of Example 1, wherein the selection of neighboring pixels is based on a measure of proximity of the neighboring pixels to the detected holes.

Example 3 includes the subject matter of Examples 1 or 2, wherein the selection of neighboring pixels is based on a comparison of the depth values of the neighboring pixels to the depth values of pixels in the transformed image frame proximate to the discontinuity associated with the detected hole.

Example 4 includes the subject matter of any of Examples 1-3, further comprising analyzing depth values of the pixels of the reference image frame to identify foreground and background features in the reference image frame; and preserving the foreground-background relationship of the features in the transformed image frame based on the analysis.

Example 5 includes the subject matter of any of Examples 1-4, further comprising receiving the reference image frame from a depth camera.

Example 6 includes the subject matter of any of Examples 1-5, wherein the transforming of the reference image frame comprises simulating a change in position of the depth camera.

Example 7 includes the subject matter of any of Examples 1-6, wherein the transforming of the reference image frame comprises simulating a change in focal length of a lens of the depth camera.

Example 8 includes the subject matter of any of Examples 1-7, further comprising substituting the reference image frame with the synthesized view for an iteration of the method on a third viewpoint.

Example 9 is a system for view synthesis. The system comprises: an image transformation circuit to transform a reference image frame corresponding to a first viewpoint, to a transformed image frame corresponding to a second viewpoint, the reference image frame and the transformed image frame each comprising a plurality of pixels associated with color values and depth values; an inverse warping circuit to calculate a mapping from the pixels of the transformed image frame to corresponding pixels of the reference image frame; a hole detection circuit to detect holes in the transformed image frame based on discontinuities between the depth values of the pixels of the transformed image frame and the depth values of the mapped corresponding pixels of the reference image frame; and a hole filling circuit to in-fill the detected holes, using a sampling of selected neighboring pixels from the reference image frame, to synthesize a view based on the transformed image frame.

Example 10 includes the subject matter of Example 9, wherein the hole-filling circuit is further to select the neighboring pixels based on a measure of proximity of the neighboring pixels to the detected holes.

Example 11 includes the subject matter of Examples 9 or 10, wherein the hole-filling circuit is further to select the neighboring pixels based on a comparison of the depth values of the neighboring pixels to the depth values of pixels in the transformed image frame proximate to the discontinuity associated with the detected hole.

Example 12 includes the subject matter of any of Examples 9-11, further comprising a background-foreground calculation circuit to analyze depth values of the pixels of the reference image frame to identify foreground and background features in the reference image frame; and to preserve the foreground-background relationship of the features in the transformed image frame based on the analysis.

Example 13 includes the subject matter of any of Examples 9-12, further comprising a depth camera to generate the reference image frame.

Example 14 includes the subject matter of any of Examples 9-13, wherein the image transformation circuit is further to transform the reference image frame to simulate a change in position of the depth camera.

Example 15 includes the subject matter of any of Examples 9-14, wherein the image transformation circuit is further to transform the reference image frame to simulate a change in focal length of a lens of the depth camera.

Example 16 includes the subject matter of any of Examples 9-15, wherein the image transformation circuit is further to substitute the reference image frame with the synthesized view for the system to generate a new synthesized view based on a third viewpoint.

Example 17 is at least one non-transitory computer readable storage medium having instructions encoded thereon that, when executed by one or more processors, result in the following operations for view synthesis. The operations comprise: transforming a reference image frame corresponding to a first viewpoint, to a transformed image frame corresponding to a second viewpoint, the reference image frame and the transformed image frame each comprising a plurality of pixels associated with color values and depth values; calculating a mapping from the pixels of the transformed image frame to corresponding pixels of the reference image frame;

detecting holes in the transformed image frame based on discontinuities between the depth values of the pixels of the transformed image frame and the depth values of the mapped corresponding pixels of the reference image frame; and performing in-filling of the detected holes, using a sampling of selected neighboring pixels from the reference image frame, to synthesize a view based on the transformed image frame.

Example 18 includes the subject matter of Example 17, wherein the selection of neighboring pixels is based on a measure of proximity of the neighboring pixels to the detected holes.

Example 19 includes the subject matter of Examples 17 or 18, wherein the selection of neighboring pixels is based on a comparison of the depth values of the neighboring pixels to the depth values of pixels in the transformed image frame proximate to the discontinuity associated with the detected hole.

Example 20 includes the subject matter of any of Examples 17-19, the operations further comprising analyzing depth values of the pixels of the reference image frame to identify foreground and background features in the reference image frame; and preserving the foreground-background relationship of the features in the transformed image frame based on the analysis.

Example 21 includes the subject matter of any of Examples 17-20, the operations further comprising receiving the reference image frame from a depth camera.

Example 22 includes the subject matter of any of Examples 17-21, wherein the transforming of the reference image frame comprises simulating a change in position of the depth camera.

Example 23 includes the subject matter of any of Examples 17-22, wherein the transforming of the reference image frame comprises simulating a change in focal length of a lens of the depth camera.

Example 24 includes the subject matter of any of Examples 17-23, the operations further comprising substituting the reference image frame with the synthesized view for an iteration of the method on a third viewpoint.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for view synthesis, the method comprising:
   transforming a reference image frame corresponding to a first viewpoint to a transformed image frame corresponding to a second viewpoint, the reference image frame and the transformed image frame each including pixels, each pixel associated with a depth value;
   calculating a mapping from one or more of the pixels of the transformed image frame back to one or more corresponding pixels of the reference image frame;
   detecting a hole in the transformed image frame based on a discontinuity between the depth value of a pixel of the transformed image frame and the depth value of a corresponding pixel mapped back to the reference image frame; and
   performing in-filling of the detected hole, using a neighboring pixel from the reference image frame.

2. The method of claim 1, wherein the neighboring pixel is selected based on a measure of proximity of a location of the neighboring pixel to a location of the detected hole.

3. The method of claim 1, wherein the neighboring pixel is selected based on a comparison of the depth value of the neighboring pixel to the depth value of the corresponding pixel in the transformed image frame proximate to a location of the discontinuity associated with the detected hole.

4. The method of claim 1, further including:
   identifying a foreground feature and a background feature in the reference image frame; and
   preserving a positional relationship between the foreground feature and the background feature in the transformed image frame.

5. The method of claim 1, wherein the transforming of the reference image frame includes simulating a change in position of a camera which generated the reference image frame.

6. The method of claim 1, wherein the transforming of the reference image frame includes simulating a change in focal length of a lens of a camera which generated the reference image frame.

7. The method of claim 1, further including substituting the reference image frame with a synthesized view based on the in-filling of the detected hole, for an iteration of the method on a third viewpoint.

8. A system for view synthesis comprising:
   an image transformation circuit to transform a reference image frame corresponding to a first viewpoint to a transformed image frame corresponding to a second viewpoint, the reference image frame and the transformed image frame each including pixels associated with depth values;
   an inverse warping circuit to calculate a mapping from the pixels of the transformed image frame back to corresponding pixels of the reference image frame;
   a hole detection circuit to detect holes in the transformed image frame based on discontinuities between the depth values of the pixels of the transformed image frame and the depth values of the corresponding pixels mapped back to the reference image frame; and
   a hole filling circuit to in-fill one of the detected holes, using neighboring pixels from the reference image frame.

9. The system of claim 8, wherein the hole-filling circuit is further to select the neighboring pixels based on one or both of: a measure of proximity of a location of the neighboring pixels to a location of the one of the detected holes; and/or a comparison of the depth values of the neighboring pixels to the depth values of pixels in the transformed image frame proximate to a location of one of the discontinuities associated with the one of the detected holes.

10. The system of claim 8, further including a background-foreground calculation circuit to:

identify foreground and background features in the reference image frame; and preserve a positional relationship between the foreground and background features in the transformed image frame.

11. The system of claim 8, wherein the image transformation circuit is further to one or both of: transform the reference image frame to simulate a change in position of a camera which generated the reference image frame; and/or transform the reference image frame to simulate a change in focal length of a lens of the camera which generated the reference image frame.

12. The system of claim 8, wherein the image transformation circuit is further to substitute the reference image frame with a synthesized view based on the in-filling of one of the detected holes, for the system to generate a new synthesized view based on a third viewpoint.

13. At least one machine-readable storage device comprising instructions that, when executed by one or more processors, cause the one or more processors to:

transform a reference image frame corresponding to a first viewpoint to a transformed image frame corresponding to a second viewpoint, the reference image frame and the transformed image frame each including pixels, each pixel associated with a depth value;

calculate a mapping from one or more of the pixels of the transformed image frame back to one or more corresponding pixels of the reference image frame;

detect a hole in the transformed image frame based on a discontinuity between the depth value of a pixel of the transformed image frame and the depth value of a corresponding pixel mapped back to the reference image frame; and perform in-filling of the detected hole, using a neighboring pixel from the reference image frame.

14. The at least one machine-readable storage device of claim 13, wherein the neighboring pixel is selected based on a measure of proximity of a location of the neighboring pixel to a location of the detected hole.

15. The at least one machine-readable storage device of claim 13, wherein the neighboring pixel is selected based on a comparison of the depth value of the neighboring pixel to the depth value of the corresponding pixel in the transformed image frame proximate to a location of the discontinuity associated with the detected hole.

16. The at least one machine-readable storage device of claim 13, wherein the instructions further cause the one or more processors to:

identify a foreground feature and a background feature in the reference image frame; and preserve a positional relationship between the foreground feature and the background feature in the transformed image frame.

17. The at least one machine-readable storage device of claim 13, wherein the instructions cause the one or more processors to transform the reference image frame to simulate a change in position of a camera which generated the reference image frame.

18. The at least one machine-readable storage device of claim 13, wherein the instructions cause the one or more processors to transform the reference image frame to simulate a change in focal length of a lens of a camera which generated the reference image frame.

19. The at least one machine-readable storage device of claim 13, wherein the instructions cause the one or more processors to substitute the reference image frame with a synthesized view based on the in-filling of the detected hole, for an iteration of a view synthesis process on a third viewpoint.

20. A system for view synthesis comprising:

at least one memory;

instructions;

processor circuitry to execute the instructions to:

transform a reference image frame corresponding to a first viewpoint to a transformed image frame corresponding to a second viewpoint, the reference image frame and the transformed image frame each including pixels associated with depth values;

calculate a mapping from the pixels of the transformed image frame back to corresponding pixels of the reference image frame;

detect holes in the transformed image frame based on discontinuities between the depth values of the pixels of the transformed image frame and the depth values of the corresponding pixels mapped back to the reference image frame; and in-fill one of the detected holes, using neighboring pixels from the reference image frame.

21. The system of claim 20, wherein the processor circuitry is to select the neighboring pixels based on one or both of: a measure of proximity of a location of the neighboring pixels to a location of the one of the detected holes; and/or a comparison of the depth values of the neighboring pixels to the depth values of pixels in the transformed image frame proximate to a location of one of the discontinuities associated with the one of the detected holes.

22. The system of claim 20, wherein the processor circuitry is to:

identify foreground and background features in the reference image frame; and preserve a positional relationship between the foreground and background features in the transformed image frame.

23. The system of claim 20, wherein the processor circuitry is to one or both of: transform the reference image frame to simulate a change in position of a camera which generated the reference image frame; and/or transform the reference image frame to simulate a change in focal length of a lens of the camera which generated the reference image frame.

* * * * *